Nov. 12, 1957  N. J. MEISDALEN  2,812,732
SEEDING ATTACHMENT
Filed Nov. 26, 1954  2 Sheets-Sheet 2
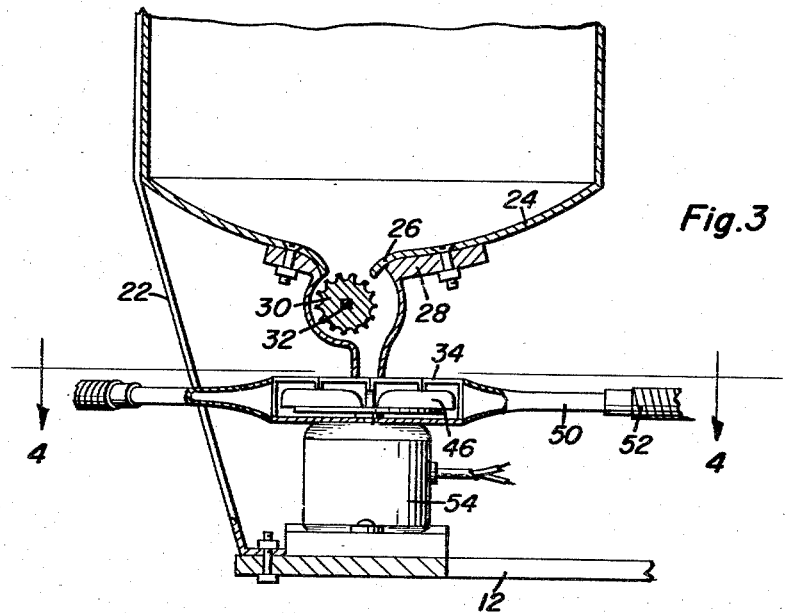
Fig. 3
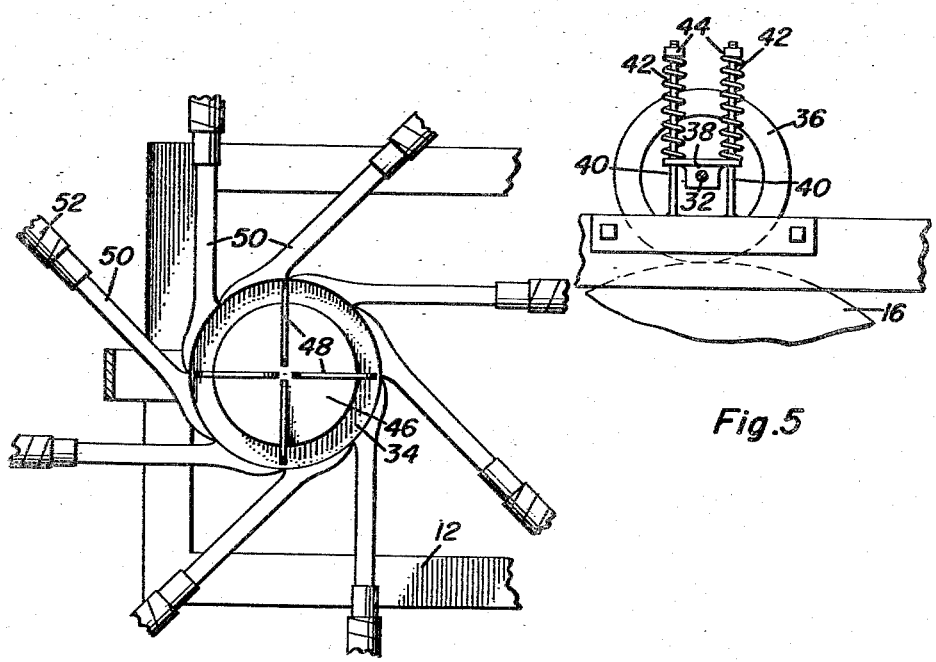
Fig. 4
Fig. 5
Noble J. Meisdalen
INVENTOR.

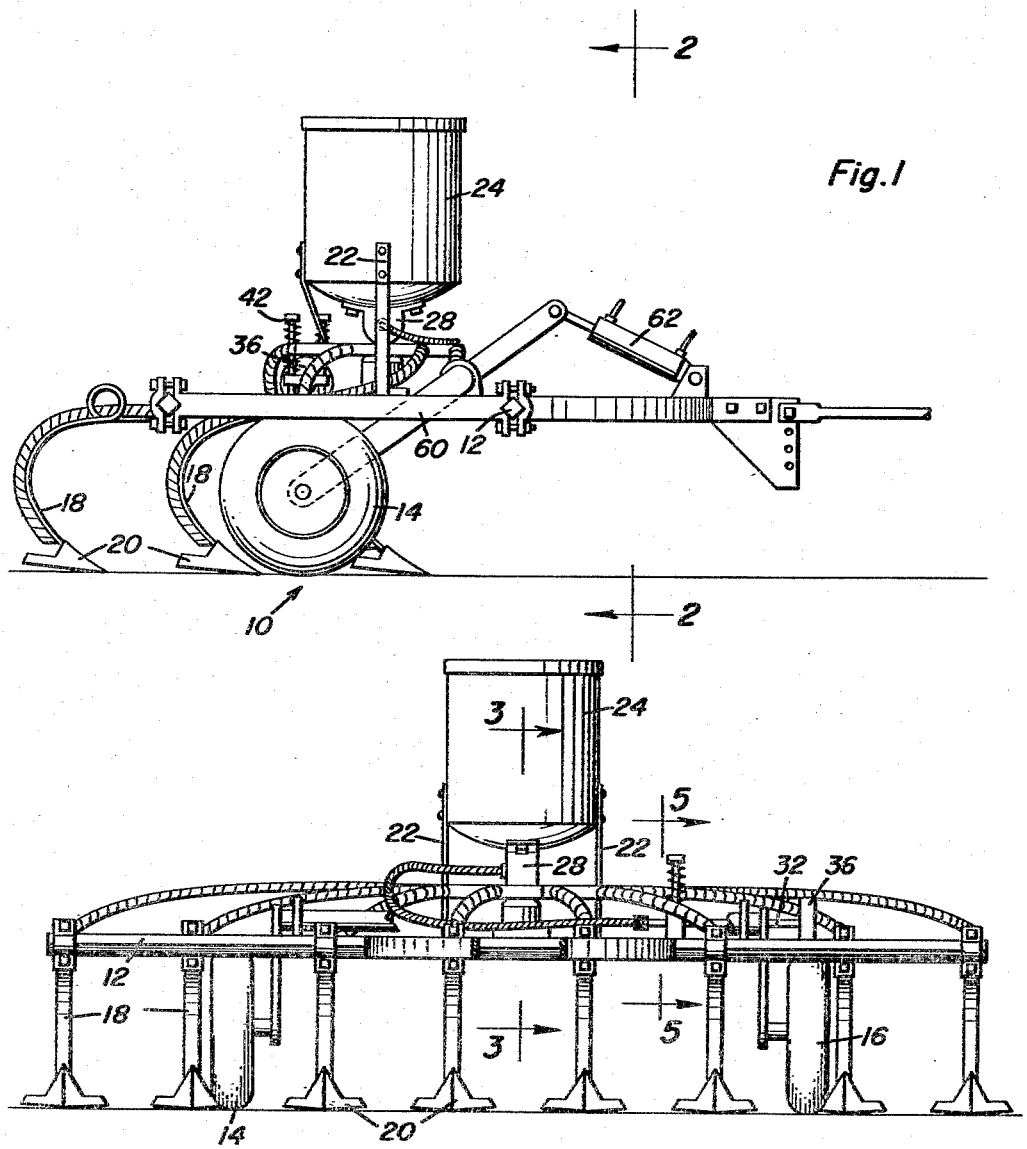

United States Patent Office 2,812,732
Patented Nov. 12, 1957

2,812,732

SEEDING ATTACHMENT

Noble J. Meisdalen, Malta, Mont.

Application November 26, 1954, Serial No. 471,376

1 Claim. (Cl. 111—52)

This invention relates to agricultural equipment and more particularly to a seeding attachment for use in conjunction with a tool bar cultivator.

The primary object of the present invention resides in the provision of an attachment for a tool bar cultivator which is adapted to spread seed in a very wide band under the cultivator shovels thus allowing the invention to be used on equipment with widely spaced shanks.

A further object of the invention resides in the provision of a seeding attachment for a tool bar cultivator adapted to function on high clearance cultivators having comparatively widely spaced front and rear rows of shanks to which the tools are attached.

A yet further object of the invention resides in the provision of novel means for utilizing the movement of the tool bar cultivator to actuate the delivery wheel of the seed hopper which feeds the seed into the distributor casing prior to distribution of the seed to delivery conduits attached thereto and extending radially divergingly therefrom.

Still further objects and features of this invention reside in the provision of a cultivator attachment which is simple in construction, light in weight, strong and durable, and highly efficient in operation.

These, together with the various ancillary objects and features of the invention which will become apparent as the following description proceeds, are attained by this seeding attachment, a preferred embodiment of which has been illustrated in the accompanying drawings, by way of example only, wherein:

Figure 1 is a side elevational view of the seeding attachment shown operatively associated with a tool bar cultivator and being drawn by a tractor;

Figure 2 is a vertical sectional view as taken along the plane of line 2—2 in Figure 1 and illustrating the seeding attachment in front elevation;

Figure 3 is a vertical sectional view as taken along the plane of line 3—3 in Figure 2 and illustrating in an enlarged scale the construction of the delivery wheel and the distributor casing;

Figure 4 is a horizontal sectional view as taken along the plane of line 4—4 in Figure 3 and illustrating the construction of the distributor wheel and casing; and Figure 5 is a sectional detail view as taken along the plane of line 5—5 in Figure 2 and illustrating in an enlarged scale the construction of the drive means for the delivery wheel.

With continuing reference to the accompanying drawings wherein like reference numerals designate similar parts throughout the various views, reference numeral 10 is used to generally designate a tool bar cultivator of conventional construction having a frame 12 from which wheels such as at 14 and 16 are suspended providing the ground engaging support for the frame 12. Appended to the frame 12 are suitable spaced rows of shanks as indicated at 18 to which ground engaging tools 20 are affixed.

Mounted on the frame 12 by any suitable means such as brackets 22 is the seed hopper 24 adapted to receive and contain the seeds to be sown. The hopper has, as best seen in Figure 3, a neck portion 26 having a delivery shoot 28 appended thereto and forming a part of the hopper. The delivery shoot 28 has mounted therein a delivery wheel 30 driven by a shaft 32 and adapted to direct seed downwardly from the neck portion of the hopped 24 to a distributor casing 34.

The shaft 32 has a wheel 36 mounted thereon which engages the wheel 16 so that the wheel 36 and the shaft 32 as well as the delivery wheel 30 is rotated in response to the movement of the wheel 16 over the ground. The shaft 32 is mounted in a bearing block 38 and rods 40 which extend through the bearing block 38 carry springs 42 which engage the bearing block 38 and stops 44 at the upper ends of the rods so as to urge the bearing block 38 and hence the wheel 36 downward to engagement with the wheel 16.

Within the distributor casing 24 there is a distributor wheel 46 having blades or fins 48 for directing seed delivered thereto successively into the various delivery conduits 50 which open into the distributor casing 34 and extend tangentially divergingly outwardly therefrom. The delivery conduits 50 may include flexible tubular portions 52 which extend downwardly and in close association with the shanks 18 so as to deliver the seed adjacent the tools 20. The distributor wheel 46 is driven by means of a motor 54 which may be electrically or hydraulically actuated, the motor being suitably mounted on the frame 12 in any convenient manner.

The tool bar cultivator is adapted to be drawn behind a tractor or operated in any other convenient manner and as can be readily recognized, as the wheel 16 revolves, the wheel 36 will cause the shaft 32 to rotate thus rotating the delivery wheel 30. This will discharge the seed into the distributor casing 34 where the distributor wheel 46 will direct the seed outwardly through the delivery conduits 50 and the tubular portions 52 thereof so that the seed may be disbursed over a wide area.

The wheels 14 are eccentrically mounted by means of members 60 to which is attached a hydraulic cylinder 62 of conventional construction used to render the seed metering mechanism inactive by raising the cultivator out of the ground by pushing down of the wheels 14 through use of cylinder 62 and optionally closing a switch (not shown) to shut off motor 54.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A seeding attachment for use in conjunction with a tool bar cultivator including a frame supported by ground engaging wheels and a plurality of spaced ground engaging tools carried by said frame, comprising a seed hopper carried by said frame, a seed distributor casing communicating with said hopper, a delivery wheel in said hopper for delivering seed from said hopper to said casing, drive means associated with one of the wheels of the cultivator for operating said delivery wheel, said drive means including a drive wheel engaging said one of the wheels of the cultivator, resilient means holding said drive wheel in engagement with said one of the wheels of the cultivator, a shaft interconnecting said drive wheel with said delivery wheel, a distributor wheel in said casing below said delivery wheel for receiving individual seeds from said delivery wheel, means for driving said distributor wheel attached thereto, a plurality of flexible tubular delivery conduits opening into said casing, said conduits delivering seed adjacent said tools, said delivery conduits extending tangentially divergingly from said casing.

References Cited in the file of this patent

UNITED STATES PATENTS

| | | |
|---|---|---|
| 46,480 | Long | Feb. 21, 1865 |
| 1,259,033 | Michel | Mar. 12, 1918 |
| 1,741,184 | Denison | Dec. 31, 1929 |
| 2,048,505 | Heim | July 21, 1936 |
| 2,157,630 | Root | May 9, 1939 |
| 2,176,528 | Gilchrist | Oct. 17, 1939 |
| 2,187,448 | Currivan et al. | Jan. 16, 1940 |
| 2,190,863 | Dance | Feb. 20, 1940 |